Feb. 3, 1970      L. BEAUDOIN      3,492,884

VARIABLE PITCH PULLEY

Filed Sept. 5, 1968

INVENTOR

Léon BEAUDOIN

BY Pierre Lespérance

AGENT

United States Patent Office 3,492,884
Patented Feb. 3, 1970

3,492,884
VARIABLE PITCH PULLEY
Leon Beaudoin, 158 Marchand St., Drummondville,
Quebec, Canada
Filed Sept. 5, 1968, Ser. No. 757,729
Int. Cl. F16h 55/56
U.S. Cl. 74—230.17    10 Claims

ABSTRACT OF THE DISCLOSURE

This invention concerns a variable pitch pulley in which elongated blocks submitted to centrifugal force have their ends slidably engaging surfaces, at least one of which is inclined to the pulley axis, to produce movement of the movable pulley flange towards the fixed pulley flange against the action of spring means.

---

The present invention relates to variable pitch pulleys, more specifically a pulley having a variable effective diameter responsive to its speed of rotation, the effective diameter increasing with the increase in the speed.

Various types of such pulleys are known, in which centrifugal weights are pivotally mounted in the pulley to force together the pulley flanges with increase of rotation of the pulley, however it has been found that these pivoted centrifugal weights often break down, fly off the pulley during use and are therefore very dangerous to persons in the vicinity.

It is the general object of the invention to provide a variable pitch pulley which overcomes the above noted disadvantages.

A more specific object of the present invention resides in the provision of a variable pitch pulley of the character described in which the centrifugal weights are in the form of elongated blocks having their ends slidably engaging surfaces at least one which is inclined relative to the pulley axis, to thus produce approaching movement of the longitudinally displaceable pulley flange towards the fixed pulley flange, said blocks being imprisoned between the surfaces and incapable of flying off the pulley under centrifugal force.

Another object of the present invention resides in the provision of a variable pitch pulley of the character described in which the centrifugal blocks have a relatively large contact area with the above noted surfaces resulting in a minimum of wear and a long life.

Another object of the present invention resides in the provision of a pulley of the character described in which the blocks are guided radially of the pulley to prevent displacement of said blocks from their intended position.

Another object of the invention resides in the provision of a pulley of the character described which is of relatively simple and inexpensive construction.

The foregoing and other objects of the present invention will become more apparent during the following disclosure and by referring to the drawings, in which.

In the drawings, like reference characters indicate like elements throughout.

Figures 1, 2:
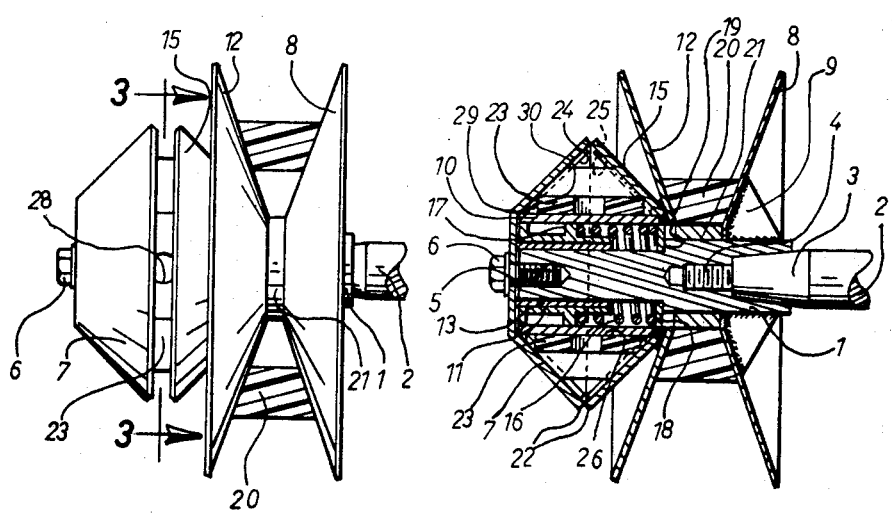
FIGURE 1 is a side elevation of the pulley in an intermediate position thereof, and showing the V-belt in cross-section.
FIGURE 2 is a longitudinal section of the pulley in its minimum effective diameter position.

The pulley of the invention comprises a shaft portion 1 adapted to be firmly secured at one end to a driving shaft 2 of an engine or the like, which has a tapered end portion 3 followed by a threaded portion 4 engaging a tapered socket and threaded bore in the shaft portion 1. The other end of shaft portion 1 has a threaded bore 5 receiving a bolt 6 which firmly secures a frusto-conical member 7 to shaft portion 1.

An inner pulley flange or disk 8 is rigidly secured to the shaft portion 1 adjacent driving shaft 2, said pulley flange being preferably reinforced by webs 9. An outer pulley flange assembly is mounted for longitudinal or axial movement on the shaft portion 1. Said assembly comprises a sleeve 10 surrounding shaft portion 1 with the interposition of a spacer cylindrical member 11, an outer pulley flange or disk 12 being secured to the inner end of sleeve 10.

Flanges 8 and 12 constitute groove forming disks for a V-belt.

Spacer member 11 is longitudinally displaceable on shaft portion 1 with the interposition of Oilite bushings 13. Sleeve 10 is press fitted around spacer member 11 and a second frusto-conical member 15 is secured to the inner end of sleeve 10 and radially outwardly projects therefrom.

A compression coil spring 16 surrounds shaft portion 1 and the inner portion of spacer 11, and abuts against a radial flange 17 of said spacer 11 at one end, and against a ring 18 at the other end, said ring resting against a shoulder 19 made in shaft portion 1, shoulder 19 being spaced outwardly from inner pulley flange 8. The spring 16 tends to displace the outer flange assembly away from the inner flange 8, until the spacer 11 and sleeve 10 abut against frusto-conical member 7.

In this position, shown in FIGURE 2, V-belt 20 is free of the pulley flanges 8 and 12 and simply rests on a bushing 21 freely rotatable on shaft portion 1, therefore, the V-belt is then in declutched position. Bushing 21 may be replaced, if desired, by a ball bearing or needle bearing assembly.

The assembly of the spacer 11 and sleeve 10 are tightly fitted one within the other and act as a unit together with pulley flange 12 and member 15.

Figure 3:
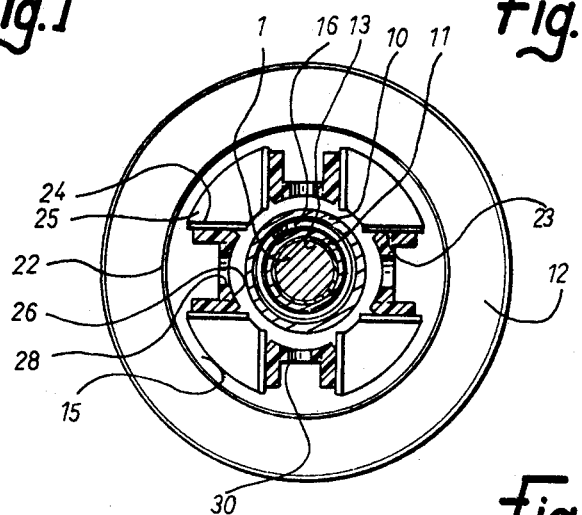
FIGURE 3 is a cross-section taken along line 3—3 of FIGURE 1.
Figure 4:
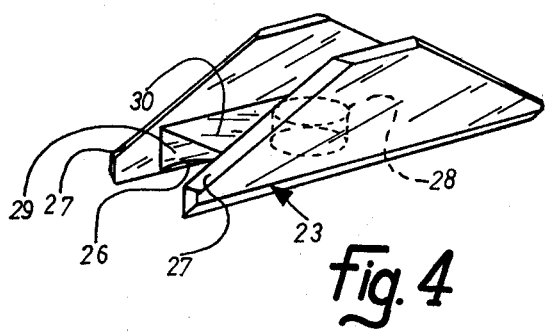
FIGURE 4 is a perspective of a centrifugal block.

The two frusto-conical members 7 and 15 are radially outwardly converging and are inclined at substantially the same angle, and have opposite outer circular edges 22. These frusto-conical members 7, 15, therefore form frusto-conical surfaces facing each other for sliding engagement with the bevelled ends of elongated blocks 23 submitted to centrifugal force. These blocks 23 are guided for radial movement by the inturned edges 24 of plates 25 secured to the surface of the frusto-conical members 7 and 15, as by spot welding or the like. These plates 25, in the case there are four blocks 23, each makes a quarter of a circle so that their edges 24 will be at right angles to each other, as shown in FIGURE 3. The edges 24 are disposed in spaced parallel pairs and the blocks 23 are engaged between the pairs of edges 24.

The blocks 23 are preferably made of synthetic resin, but may be made of metal, fibrous material or other suitable materials. They have an inner concave surface 26 of a radius substantially equal to the outer radius of sleeve 10, so as to conform with the latter when the blocks 23 are in their radially innermost position. They preferably have a U-shaped cross-section with the end faces 29 of web 30 recessed with respect to the end faces of the block wings.

The bevel end faces 27 of the block wings are transversely curved to conform to the frusto-conical surfaces of members 7 and 15 in the radially innermost position of the blocks. When said blocks move radially outwardly, the end faces 27 thereof will progressively bear only at the inner side zones of said end faces against members 7 and 15.

A hole 28 of the required diameter, is made in web 30 to obtain the exact weight of the block in relation to the intended centrifugal force to be exerted thereby.

When the two pulley flanges take their closest limit position with the belt 20 at its maximum pitch, sleeve 10 moves over bushing 21, so that the two pulley flanges abut each other. In this position, the outer edges 22 of the two frusto-conical members 7 and 15 are spaced from each other a distance which is smaller than the minimum dimension of the centrifugal blocks 23 so that these blocks can never escape from between the two frusto-conical members, and therefore there is no danger, with the system of the invention, to persons in the vicinity of the rotating pulley.

Because frusto-conical member 7 is rigidly secured to shaft portion 1, and that the blocks 23 are longitudinally guided by the guideways constituted by edges 24, these blocks serve to transmit the rotation of the shaft to the movable outer flange 12 of the pulley and therefore the latter rotates at the same speed as the inner flange 8 and there is no slippage between the pulley flanges and the belt 20; obviously spacer 11 could be splined with shaft portion 1 to prevent rotation of pulley flange 12 relative to pulley flange 8 while allowing longitudinal movement of flange 12. However such a splined system is practical only when the pulley is driven by a substantially vibrationless motor as vibrations cause rapid wearing of the splines.

The blocks 23 constitute very safe means to close the pulley flanges with increase in the rotational speed of shaft portion 1; the blocks have a free sliding contact with the frustoc-conical surfaces and have a long life.

Moreover, the system of the invention is very simple to manufacture.

It is understood that frusto-conical member 15 and outer flange 12 could be made from the same element, if so desired.

Although frusto-conical members 7 and 15 are shown as equally inclined, it is obvious that they may be unequally inclined with the block ends 27 correspondingly bevelled and the blocks having a corresponding non uniform weight along the length thereof. At the limit, one of the members 7 and 15 could be a flat disk.

The inclination of members 7 and 15 may be varied in accordance with the particular application of the pulley. These members, instead of being frusto-conical, could be for instance in the shape of a pyramid providing inclined flat surfaces in a number equal to the number of blocks 23, in which case the end faces of said blocks could be flat to contact said surfaces over their entire area or could have a recessed central zone so as to bear on the inclined surfaces only along the lateral zones of said ends.

What I claim is:

1. A variable pitch pulley for a belt comprising a shaft portion, an inner flange secured to said shaft portion, an outer flange assembly having a sleeve on said shaft portion, spring means urging said outer flange assembly away from said inner flange, a member secured to said shaft portion spaced from said outer flange assembly, said member and outer flange assembly forming opposed surfeces, at least one of said surfaces inclined, relative to the axis of said shaft portion, radially outwardly towards the other of said surfaces, centrifugal blocks extending between and having their ends in slidable contact with said surfaces, and radial guide means on said surfaces guiding said blocks for radial movement under centrifugal force to move said outer flange assembly towards said inner flange against the action of said spring means.

2. A variable pitch pulley as claimed in claim 1, wherein both surfaces are substantially frusto-conical in shape and are radially outwardly converging.

3. A variable pitch pulley as claimed in claim 2, wherein said blocks are movable outwardly from a radially innermost to a radially outermost position, are of elongated shape with lateral bevelled end faces conforming to said frusto-conical surfaces in the innermost position of said blocks.

4. A variable pitch pulley as claimed in claim 1, wherein both surfaces are frusto-conical surfaces of substantially equal inclination and are radially outwardly converging.

5. A variable pitch pulley as claimed in claim 4, wherein said surfaces have outer edges opposite each other, said outer flange assembly having a limit position close to said inner flange, the spacing between said edges in said limit position being smaller than the minimum dimension of said blocks to prevent escape of said blocks from between said surfaces.

6. A variable pitch pulley as claimed in claim 1, wherein said outer flange assembly has a limit position close to said inner flange, the minimum spacing between said surfaces in said limit position being smaller than the size of said blocks to prevent escape of said blocks from between said surfaces.

7. A variable pitch pulley as claimed in claim 1, wherein said blocks are made of synthetic resin.

8. A variable pitch pulley as claimed in claim 1, further including a spacer member secured to said sleeve and located between the same and said shaft portion, abutment means on said shaft spaced from said spacer member, said spring means located within said sleeve between said spacer member and said abutment means.

9. A variable pitch pulley as claimed in claim 1, wherein said outer flange assembly is composed of a pulley flange and of a frusto-conical member both secured to said sleeve and constituting separate elements.

10. A centrifugal force variable speed V-belt pulley comprising a shaft, a belt pulley mounted on said shaft and composed of a pair of belt groove forming disks, one of said disks secured to said shaft, the other disk axially movable and rotatable with respect to said shaft, a pair of conical members mounted on said shaft externally of said movable disk, said conical members radially outwardly converging, one of said members adjacent to said axially movable disk forming a unit therewith, the other of said members secured to said shaft, elongated blocks extending between and having their ends in slidable contact with said two conical members and radial guide means on said conical members, guiding said blocks for radial movement, said blocks having their longitudinal axis substantially parallel to said shaft.

References Cited

UNITED STATES PATENTS

| 2,150,456 | 3/1939 | Perrine. | |
| 2,253,634 | 8/1941 | Mack | 74—230.17 |
| 2,928,286 | 3/1960 | Davis | 74—230.17 |

FOREIGN PATENTS

| 608,199 | 9/1948 | Great Britain. |
| 883,174 | 3/1943 | France. |

JAMES A. WONG, Primary Examiner